US012334326B2

(12) United States Patent
Miyazaki et al.

(10) Patent No.: US 12,334,326 B2
(45) Date of Patent: Jun. 17, 2025

(54) ION ANALYZER

(71) Applicant: SHIMADZU CORPORATION, Kyoto (JP)

(72) Inventors: Yuta Miyazaki, Kyoto (JP); Shiro Mizutani, Kyoto (JP); Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 367 days.

(21) Appl. No.: 17/918,375

(22) PCT Filed: Apr. 17, 2020

(86) PCT No.: PCT/JP2020/016876
§ 371 (c)(1),
(2) Date: Oct. 12, 2022

(87) PCT Pub. No.: WO2021/210165
PCT Pub. Date: Oct. 21, 2021

(65) Prior Publication Data

US 2023/0197427 A1 Jun. 22, 2023

(51) Int. Cl.
*H01J 49/02* (2006.01)
*H01J 49/16* (2006.01)

(52) U.S. Cl.
CPC .......... *H01J 49/022* (2013.01); *H01J 49/167* (2013.01)

(58) Field of Classification Search
CPC .......... H01J 49/022; H01J 49/10; H01J 49/16; H01J 49/167
See application file for complete search history.

(56) References Cited

U.S. PATENT DOCUMENTS 6,617,768 B1 * 9/2003 Hansen ................. H01J 49/025 313/105 CM
9,778,224 B2 * 10/2017 Kubelik ................. G01N 27/68
(Continued)

FOREIGN PATENT DOCUMENTS

| | | | |
|---|---|---|---|
| CN | 1906728 | A | 1/2007 |
| CN | 105814440 | A | 7/2016 |
| WO | 2018/078693 | A1 | 5/2018 |

OTHER PUBLICATIONS

Notice of Allowance dated Jun. 27, 2023 from the Japanese Patent Office in Application No. 2022-515166.
(Continued)

*Primary Examiner* — David E Smith
(74) *Attorney, Agent, or Firm* — Sughrue Mion, PLLC

(57) ABSTRACT

An ion analyzer 2 including: a power feeding circuit 26 in which a power supply connection part 261, a first electrode connection part 262, a first resistance element 263, a second electrode connection part 264, a second resistance element 265, and a grounding part are provided in series; a power supply P connected to the power supply connection part 261 and configured to output both a DC positive voltage and a DC negative voltage; a first voltage supply electrode 23 connected to the first electrode connection part 262; and a second voltage supply electrode 24 connected to the second electrode connection part 264. In particular, it can be suitably used as a device for applying a voltage to a push electrode 23 and a convergence electrode 24 disposed in an ionization chamber 20 of a mass spectrometer including an ESI source 21.

6 Claims, 5 Drawing Sheets

(56) References Cited

U.S. PATENT DOCUMENTS

| | | | | |
|---|---|---|---|---|
| 2004/0108451 | A1 | 6/2004 | Hansen | |
| 2007/0114455 | A1* | 5/2007 | Naito | H01J 37/1477<br>250/492.21 |
| 2017/0023525 | A1 | 1/2017 | Kubelik et al. | |
| 2019/0189418 | A1* | 6/2019 | Miura | H01J 49/022 |
| 2019/0252178 | A1 | 8/2019 | Nishiguchi | |

OTHER PUBLICATIONS

International Search Report of PCT/JP2020/016876 dated Jun. 30, 2020 [PCT/ISA/210].

Written Opinion of PCT/JP2020/016876 dated Jun. 30, 2020 [PCT/ISA/237].

Communication dated Mar. 3, 2025 in Chinese Application No. 202080098952.5.

* cited by examiner

ION ANALYZER

CROSS REFERENCE TO RELATED APPLICATIONS

This application is a National Stage of International Application No. PCT/JP2020/016876, filed Apr. 17, 2020.

TECHNICAL FIELD

The present invention relates to an ion analyzer.

BACKGROUND ART

One of devices for analyzing a substance contained in a liquid sample is a liquid chromatograph mass spectrometer. In the liquid chromatograph mass spectrometer, a liquid sample is introduced into a column of a liquid chromatograph on a flow of a mobile phase, and a target substance is separated from other substances inside the column. The target substance flowing out of the column is ionized by an ionization source of the mass spectrometer, and then separated according to a mass-to-charge ratio in a mass spectrometry section and measured.

As an ionization source of the mass spectrometer, for example, an electrospray ionization (ESI) source is used. The ESI source is one of atmospheric pressure ionization sources that ionize a target substance in an atmospheric pressure atmosphere. In the ESI source, the liquid sample is charged, and the charged liquid sample is sprayed with a nebulizer gas and is nebulized into the ionization chamber. The charged droplets nebulized into the ionization chamber are split due to charge repulsion inside the droplets, and vaporization (desolvation) of the mobile phase creates ions.

In the mass spectrometer, when substances other than ions derived from a target substance, such as droplets for example containing a large amount of neutral molecules derived from a mobile phase, enter the mass spectrometry section, the mass spectrometry section is contaminated. Therefore, in many ESI sources, an arrangement of an ESI nozzle and an ion introduction unit is determined such that the direction in which charged droplets are nebulized from the ESI nozzle and the direction in which ions are introduced from the ionization chamber to the mass spectrometry section are set orthogonal to each other. Ions generated in the ionization chamber are taken into the mass spectrometry section on a gas flow generated by the pressure difference between the ionization chamber at atmospheric pressure and the mass spectrometry section at vacuum.

Patent Literature 1 describes a configuration for enhancing an intake efficiency of ions into the mass spectrometry section in an ESI source having the above configuration. The ESI source includes a plate-shaped convergence electrode having an opening surrounding an ion intake port from an ionization chamber to the mass spectrometry section, and a plate-shaped push electrode disposed on an opposite side of the convergence electrode across an ESI nozzle. A first voltage having the same polarity as that of an ion to be measured is applied to the push electrode from a first power supply. Further, a second voltage having the same polarity as that of the ion to be measured and having an absolute value smaller than that of the first voltage is applied to the convergence electrode from a second power supply. Furthermore, the ion intake port is grounded. The ions contained in the jet emitted from the ESI nozzle are pushed toward the convergence electrode by a potential gradient from the push electrode toward the convergence electrode, and are converged to the ion intake port by a potential gradient from the convergence electrode toward the ion intake port. On the other hand, neutral molecules are not affected by the potential gradient. Therefore, it is possible to enhance the intake efficiency of ions derived from the target substance while suppressing the neutral molecules derived from the mobile phase or the like from entering the mass spectrometry section and contaminating the mass spectrometry section.

CITATION LIST

Patent Literature

Patent Literature 1: WO 2018/078693 A

SUMMARY OF INVENTION

Technical Problem

In the mass spectrometer, both the measurement of positive ions and the measurement of negative ions may be successively performed. In a case where the measurement of positive ions and the measurement of negative ions are successively performed in the ESI source described in Patent Literature 1, the polarity of the voltages applied to the push electrode and the convergence electrode is switched. The first voltage is applied to the push electrode from the first power supply, and the second voltage is applied to the convergence electrode from the second power supply. However, even if a control signal instructing polarity switching is simultaneously output to the first power supply and the second power supply, the time required for the polarity of the voltage actually output from the first power supply to be switched with respect to the control signal and the time required for the polarity of the voltage output from the second power supply to be switched do not always completely coincide with each other. That is, since the first power supply and the second power supply do not necessarily have the same response characteristic, there may be a difference between the timing at which the polarity switching of the first voltage applied to the push electrode is completed and the timing at which the polarity switching of the second voltage applied to the convergence electrode is completed. At that time, an undesired electric field is formed between the push electrode and the convergence electrode, and the intake efficiency of ions into the mass spectrometry section is deteriorated.

Here, the ionization source of the mass spectrometer has been described as an example, but there has been a problem similar to the above in various situations where the behavior of ions is controlled by applying voltages of the same polarity and different magnitudes to two electrodes in an ion analyzer to generate potential gradients.

A problem to be solved by the present invention is to provide a technique for suppressing generation of an undesired electric field between electrodes when polarity of applied voltages is switched in an ion analyzer that controls behavior of ions by applying voltages having the same polarity and different magnitudes to the two electrodes to generate a potential gradient.

Solution to Problem

An ion analyzer according to the present invention made to solve the above problems includes:

a power feeding circuit in which a power supply connection part, a first electrode connection part, a first resistance element, a second electrode connection part, a second resistance element, and a grounding part are provided in series;

a power supply connected to the power supply connection part and configured to output both a DC positive voltage and a DC negative voltage;

a first voltage supply electrode connected to the first electrode connection part; and a second voltage supply electrode connected to the second electrode connection part.

Advantageous Effects of Invention

In the ion analyzer according to the present invention, the feeding supply circuit in which the power supply connection part, the first electrode connection part, the first resistance element, the second electrode connection part, the second resistance element, and the grounding part are provided in series is used, the power supply is connected to the power supply connection part, and a voltage having a predetermined magnitude is applied to the power supply connection part. As a result, the voltage of the predetermined magnitude is applied to the first voltage supply electrode connected to the first electrode connection part adjacent to the power supply connection part. Further, the voltage of the predetermined magnitude and a voltage of a magnitude corresponding to a resistance value of the first resistance element and a resistance value of the second resistance element are applied to the second voltage supply electrode connected to the second electrode connection part. That is, in the ion analyzer according to the present invention, since two types of voltages having a potential difference corresponding to the resistance values of the resistance elements can be simultaneously output to both the first voltage supply electrode and the second voltage supply electrode using a single power supply, there is no difference between the timing at which the polarity switching of the first voltage applied to the first voltage supply electrode is completed and the timing at which the polarity switching of the second voltage applied to the second voltage supply electrode is completed. Therefore, when the polarity of the voltage is switched, generation of an undesired electric field between the electrodes is suppressed.

DESCRIPTION OF EMBODIMENTS

A liquid chromatograph mass spectrometer including an embodiment of an ion analyzer according to the present invention will be described below with reference to the drawings.

Figure 1:
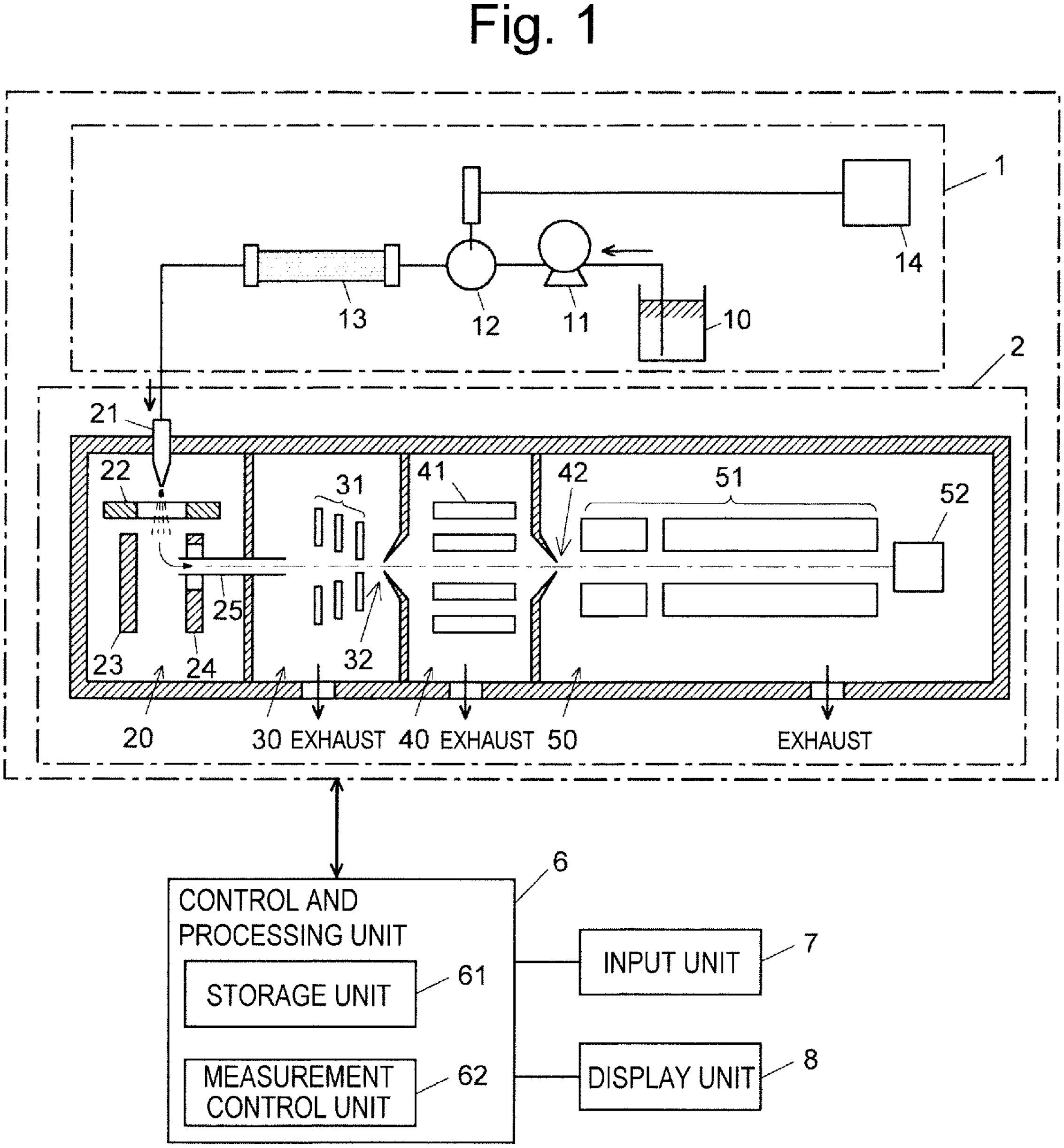
FIG. 1 is a configuration diagram of a main part of a liquid chromatograph mass spectrometer including an embodiment of an ion branching device according to the present invention.

FIG. 1 is a configuration diagram of a main part of a liquid chromatograph mass spectrometer of the present embodiment. The liquid chromatograph mass spectrometer of the present embodiment roughly includes a liquid chromatograph 1, a mass spectrometer 2, and a control and processing unit 6 that controls operations of the liquid chromatograph 1 and the mass spectrometer 2.

The liquid chromatograph 1 includes a mobile phase container 10 in which a mobile phase is stored, a pump 11 that sucks the mobile phase and delivers the mobile phase at a constant flow rate, an injector 12 that injects a predetermined amount of sample liquid into the mobile phase, and a column 13 that separates various compounds contained in the sample liquid in a time direction. Further, to the liquid chromatograph 1, an autosampler 14 that introduces a plurality of liquid samples one by one into the injector 12 is connected.

The mass spectrometer 2 includes an ionization chamber 20, a first intermediate vacuum chamber 30, a second intermediate vacuum chamber 40, and an analysis chamber 50. The inside of the ionization chamber 20 is a substantially atmospheric pressure atmosphere. On the other hand, the inside of the analysis chamber 50 is evacuated to a high vacuum state of, for example, about $10^{-3}$ to $10^{-4}$ Pa by a high-performance vacuum pump (not illustrated). The first intermediate vacuum chamber 30 and the second intermediate vacuum chamber 40 sandwiched between the ionization chamber 20 and the analysis chamber 50 are also evacuated by a vacuum pump (not illustrated), and have a configuration of a multi-stage differential exhaust system in which a degree of vacuum is increased stepwise from the ionization chamber 20 toward the analysis chamber 50.

Figure 2:
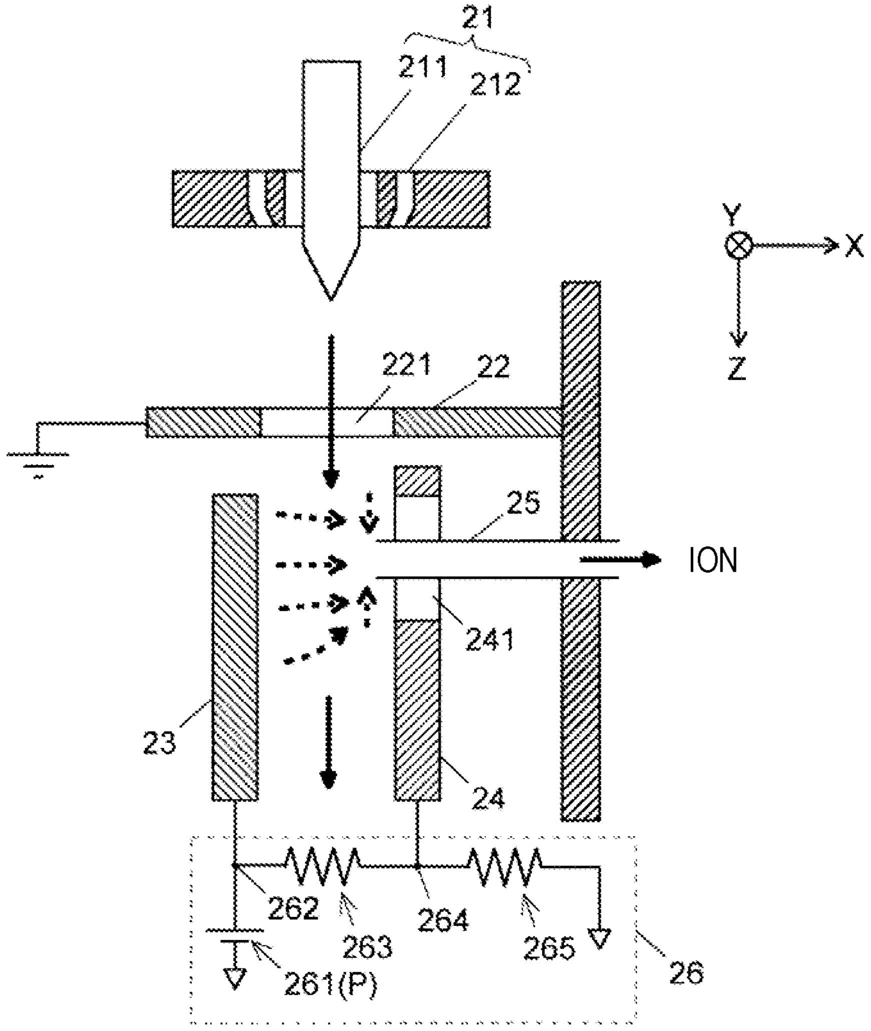
FIG. 2 is a diagram for explaining a configuration of an ionization source of the liquid chromatograph mass spectrometer of the present embodiment.

An ESI ionization probe 21 is disposed in the ionization chamber 20. As illustrated in FIG. 2, the ESI ionization probe 21 includes an ESI nozzle 211 and an assist gas nozzle 212. In the ESI nozzle 211, a predetermined high voltage (ESI voltage) is applied to a liquid sample flowing out of the column 13 of the liquid chromatograph 1, and a nebulizer gas is sprayed to the charged liquid sample to nebulize the liquid sample into the ionization chamber 20 as charged droplets.

A heating gas is supplied to the assist gas nozzle 212. The heating gas promotes vaporization (desolvation) of a mobile phase contained in the liquid sample nebulized from the ESI nozzle 211. The charged droplet nebulized from the ESI ionization probe 21 comes into contact with the surrounding atmosphere to be refined, and a sample component protrudes with a charge to become an ion in a process in which a solvent such as a mobile phase evaporates from the droplet. A ground electrode 22, a push electrode 23, and a convergence electrode 24 are disposed in front of a nebulization flow from the ESI ionization probe 21. A predetermined DC voltage is applied from a power feeding circuit 26 to the push electrode 23 and the convergence electrode 24.

The ionization chamber 20 and the first intermediate vacuum chamber 30 communicate with each other by a heated capillary 25 having a small diameter. Since there is a pressure difference between both opening ends of the heated capillary 25, a gas flow flowing from the ionization chamber 20 to the first intermediate vacuum chamber 30 is formed by the pressure difference. Ions generated in the ionization chamber 20 are sucked into the heated capillary 25 along with a flow of the gas flow, and are introduced into the first intermediate vacuum chamber 30 together with the gas flow from an outlet end of the heated capillary.

A partition wall separating the first intermediate vacuum chamber 30 and the second intermediate vacuum chamber 40 is provided with a skimmer 32 having a small-diameter opening at a top of the skimmer 32. An ion guide 31 including a plurality of ring-shaped electrodes arranged to surround an ion optical axis is disposed in the first intermediate vacuum chamber 30. The ions introduced into the first intermediate vacuum chamber 30 are converged in the vicinity of an opening of the skimmer 32 by the action of an electric field formed by the ion guide 31, and are sent into the second intermediate vacuum chamber 40 through the opening.

In the second intermediate vacuum chamber 40, a multipole (for example, an octupole) type ion guide 41 including a plurality of rod electrodes is disposed. The ions are converged by the action of a radio-frequency electric field formed by the ion guide 41, and are sent into the analysis chamber 50 through an opening of a skimmer 42 provided in a partition wall separating the second intermediate vacuum chamber 40 and the analysis chamber 50.

In the analysis chamber 50, a quadrupole mass filter 51 and an ion detector 52 are disposed. The ions introduced into the analysis chamber 50 are introduced into the quadrupole mass filter 51, and only ions having a specific mass-to-charge ratio pass through the quadrupole mass filter 51 and reach the ion detector 52 by the action of an electric field formed by a radio-frequency voltage and a direct-current voltage applied to the quadrupole mass filter 51. The ion detector 52 generates a detection signal corresponding to an amount of reached ions, and outputs the detection signal to the control and processing unit 6.

The control and processing unit 6 includes a storage unit 61 and a measurement control unit 62. The substance of the control and processing unit 6 is a general computer, and the measurement control unit 62 is embodied as a functional block by executing dedicated software installed in advance by a processor. An input unit 7 and a display unit 8 are connected to the control and processing unit 6.

The configuration of the ionization chamber 20 will be described in more detail with reference to FIG. 2. Here, for convenience, a blowing direction along a central axis of the nebulization flow from the ESI ionization probe 21 is defined as a Z-axis direction, an ion intake direction along a central axis of the heated capillary 25 orthogonal to the Z-axis direction is defined as an X-axis direction, and a direction orthogonal to the X-axis direction and the Z-axis direction is defined as a Y-axis direction.

In the ionization chamber 20, the ground electrode 22 is disposed at a position closest to the ESI ionization probe 21. The ground electrode 22 is a flat plate-shaped electrode parallel to an X-Y plane, and has an opening part 221 centered on the central axis of the nebulization flow from the ESI ionization probe 21.

The convergence electrode 24 is disposed at an end of the heated capillary 25 on an inlet side. The convergence electrode 24 is a flat plate-shaped electrode parallel to a Y-Z plane, and has an opening part 241 formed to surround an end on the inlet side of the heated capillary 25.

The flat-plate-like push electrode 23 parallel to the Y-Z axis plane is disposed to face an inlet end of the heated capillary 25 and the convergence electrode 24 with the nebulization flow interposed between the inlet end of the heated capillary 25 and the convergence electrode 24 and the flat-plate-like push electrode 23. That is, the nebulization flow from the ESI ionization probe 21 passes through the opening part 221 of the ground electrode 22, and then enters a space between the push electrode 23 and the convergence electrode 24.

The ground electrode 22 and the heated capillary 25 are connected to a partition wall of a grounded chamber. Therefore, these potentials are 0 V. On the other hand, a predetermined DC voltage is applied from the power feeding circuit 26 to the push electrode 23 and the convergence electrode 24.

The power feeding circuit 26 is a circuit in which a power supply connection part 261, a first electrode connection part 262, a first resistance element 263, a second electrode connection part 264, a second resistance element 265, and a grounding part are provided in series. A power supply P is connected to the power supply connection part 261. The push electrode 23 is connected to the first electrode connection part 262. The convergence electrode 24 is connected to the second electrode connection part 264.

When a voltage V1 is output from the power supply P, the voltage V1 is applied to the push electrode 23 connected to the first electrode connection part 262. Further, a voltage V2 having the same polarity as V1 and having a magnitude corresponding to a resistance value R1 of the first resistance element and a resistance value R2 of the second resistance element is applied to the convergence electrode 24 connected to the second electrode connection part 264. An absolute value $|V1|$ of the voltage V1 is, for example, in a range of 2 to 5 kV. Further, an absolute value $|V2|$ of the voltage V2 is, for example, in a range of 1 to 3 kV. However, $|V1|>|V2|>0$.

In the ESI nozzle 211, a DC high voltage of several kV is applied to the liquid sample. The polarities of the voltage V1 applied to the push electrode 23 and the voltage V2 applied to the convergence electrode 24 are the same as the polarity of the ion to be measured. That is, if the ion to be measured is a positive ion, the polarities of the voltages V1 and V2 are both positive. Further, if the ion to be measured is a negative ion, the polarities of the voltages V1 and V2 are both negative.

Hereinafter, an example of measurement of a liquid sample using the liquid chromatograph mass spectrometer of the present embodiment will be described. Here, a case where mass spectra of a target substance contained in a liquid sample are acquired in both a positive ion mode and a negative ion mode will be described. In this example, the resistance value R1 of the first resistance element 263 and the resistance value R2 of the second resistance element 265 are 250 MΩ.

When the user reads a method file in which measurement conditions of the liquid sample are described from the storage unit 61 and instructs to start the measurement, the measurement control unit 62 operates each unit of the liquid chromatograph mass spectrometer as follows.

The autosampler 14 injects a preset liquid sample from the injector 12 into the flow of the mobile phase. The liquid sample injected into the mobile phase is introduced into the column 13. In the column 13, substances contained in the liquid sample are separated from each other and flow out. The liquid sample flowing out of the column 13 of the liquid chromatograph 1 is sequentially introduced into the ESI ionization probe 21. In the ESI ionization probe 21, a voltage of positive high voltage (ESI voltage. For example, several kV) is applied to the liquid sample, and positively charged charged droplets are nebulized.

In accordance with the retention time of the target substance, the power feeding circuit 26 outputs a DC voltage of +4 kV from the power supply P. As a result, a voltage V1 of +4 kV is applied to the push electrode connected to the first electrode connection part 262. Further, a voltage V2 of +2 kV is applied to the convergence electrode connected to the second electrode connection part 264.

When the voltages are applied to the push electrode 23 and the convergence electrode 24 (the ground electrode 22 is grounded), a push electric field having a force of pushing positive ions in a direction from the push electrode 23 toward the convergence electrode 24 is formed between the push electrode 23 and the convergence electrode 24. Further, since a potential difference between the push electrode 23 and the heated capillary 25 is larger than a potential difference between the push electrode 23 and the convergence electrode 24, a reflected electric field having a force of more strongly pushing ions from the push electrode 23 toward the heated capillary 25 is formed. Furthermore, a converging electric field having a force of pushing positive ions in a direction from the converging electrode 24 toward the heated capillary 25, that is, from an inner edge of the opening part 241 of the converging electrode 24 toward a center thereof is also formed.

The nebulization flow containing ions having passed through the opening part 221 of the ground electrode 22 travels downward in the space between the push electrode 23 and the convergence electrode 24. At this time, due to the action of the electric fields, ions having a positive charge are pushed in a direction of the convergence electrode 24 and separated from the gas flow. Further, when the ions arrive near the inlet end of the heated capillary 25, the ions converge toward the inlet end. On the other hand, neutral molecules derived from the mobile phase or the like contained in the charged droplets travel straight without being affected by the electric fields. Therefore, only ions can be efficiently introduced into the first intermediate vacuum chamber 30.

The ions introduced into the first intermediate vacuum chamber 30 are converged by the ion guide 31, and are introduced into the second intermediate vacuum chamber 40 through the opening at the top of the skimmer 32. The ions introduced into the second intermediate vacuum chamber 40 are further converged by the ion guide 41 and introduced into the analysis chamber 50 through the opening at a top of the skimmer 42. The ions introduced into the analysis chamber 50 are mass-separated by the quadrupole mass filter 51 and detected by the ion detector 52. Mass spectrum data in the positive ion mode is obtained by scanning the mass-to-charge ratio passing through the quadrupole mass filter 51 in a predetermined range.

When the mass spectrum data in the positive ion mode is obtained, the measurement control unit 62 inverts the polarity of the voltage applied to each unit in the mass spectrometer 2. That is, in the ESI ionization probe 21, a voltage of negative high voltage (ESI voltage. For example, several kV) is applied to the liquid sample, and negatively charged droplets are nebulized.

The output voltage V1 from the power supply P of the power feeding circuit 26 is changed to-4 kV. As a result, a voltage of-4 kV is applied to the push electrode 23, and a voltage of-2 kV is applied to the convergence electrode 24.

In the conventional mass spectrometer, a power source is independently connected to each of the push electrode 23 and the convergence electrode 24. For example, a voltage is applied from a first power supply to the push electrode 23, and a voltage is applied from a second power supply to the convergence electrode 24. For this reason, even if a control signal instructing polarity switching is simultaneously output to the first power supply and the second power supply, time required for the polarity of the voltage actually output from the first power supply to be switched with respect to the control signal does not coincide with time required for the polarity of the voltage output from the second power supply to be switched.

That is, in the conventional mass spectrometer, since the first power supply and the second power supply do not necessarily have the same response characteristic, there may be a difference between the timing at which the polarity switching of the first voltage applied to the push electrode is completed and the timing at which the polarity switching of the second voltage applied to the convergence electrode is completed. As a result, when the polarity of the measurement mode is switched, an undesired electric field is formed between the push electrode 23 and the convergence electrode 24, and the intake efficiency of ions into the mass spectrometry section is deteriorated.

Figure 3:
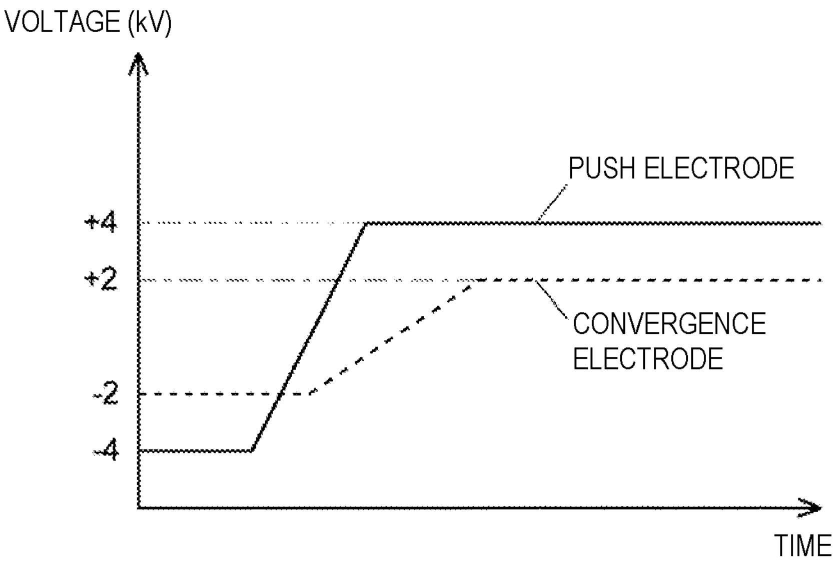
FIG. 3 is a graph illustrating voltage changes of a push electrode and a convergence electrode in an ionization source of a conventional mass spectrometer.
Figure 4:
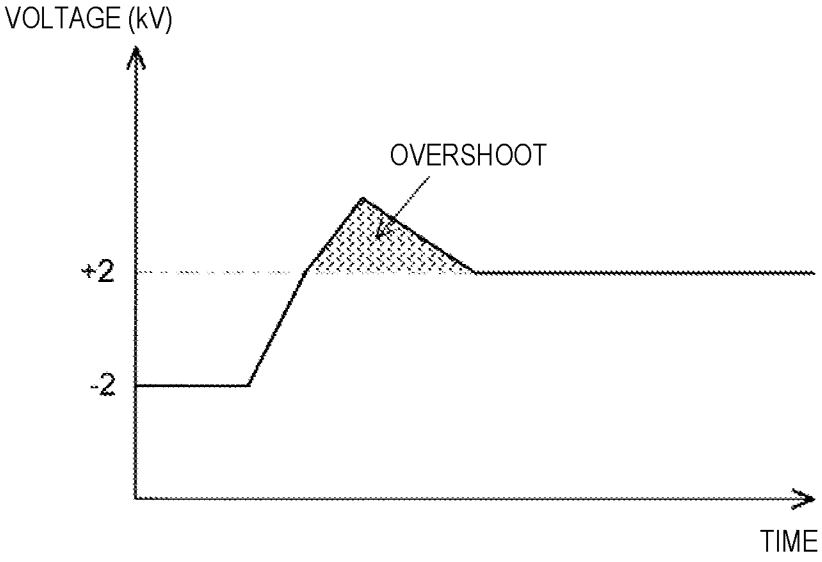
FIG. 4 is a graph illustrating a change in a difference between a voltage applied to the push electrode and a voltage applied to the convergence electrode in the ionization source of the conventional mass spectrometer.

A specific example will be described with reference to FIGS. 3 and 4. As illustrated in FIG. 3, if the time required for switching the polarity of the voltage output from the first power supply is shorter than the time required for switching the polarity of the voltage output from the second power supply, a potential difference formed between the push electrode 23 and the convergence electrode changes as illustrated in FIG. 4. As a result, an overshoot (excessive potential difference) occurs in the middle of the polarity switching.

Figure 5:
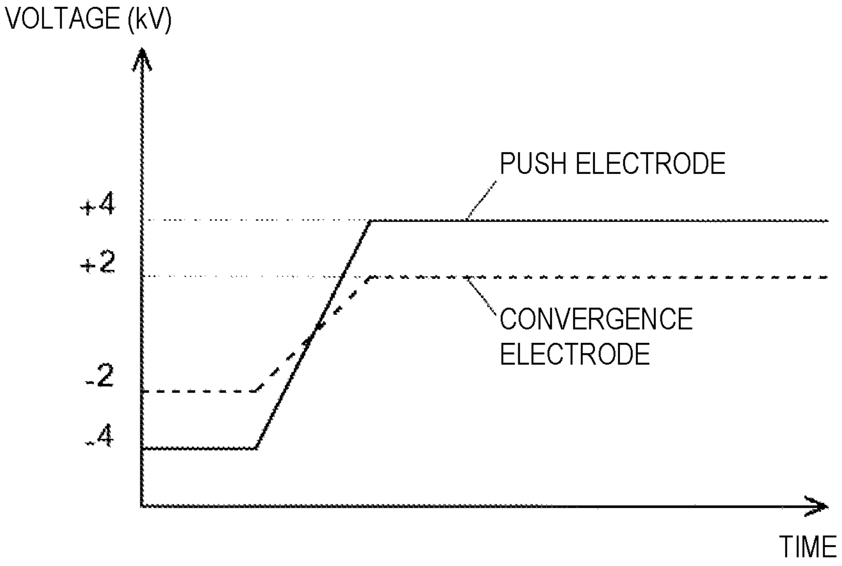
FIG. 5 is a graph illustrating voltage changes of a push electrode and a convergence electrode in the present embodiment.
Figure 6:
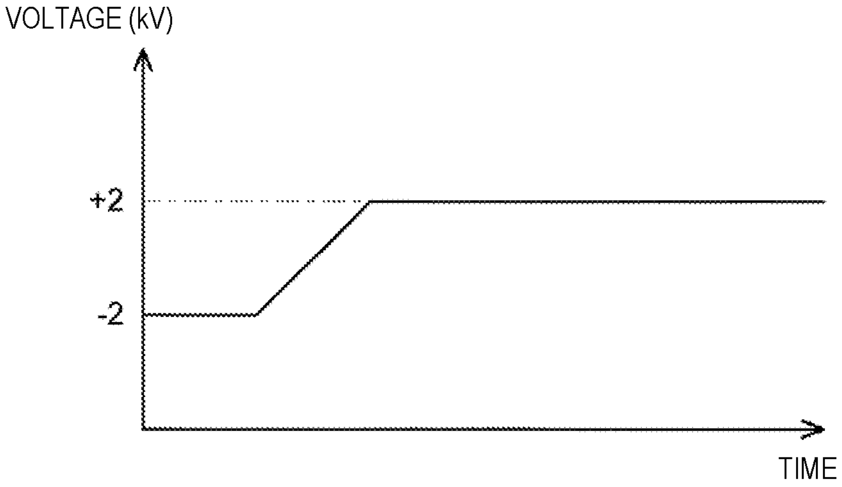
FIG. 6 is a graph illustrating a change in a difference between a voltage applied to the push electrode and a voltage applied to the convergence electrode in the present embodiment.

On the other hand, in the present embodiment, since the voltage is applied from the single power supply P to both the push electrode 23 and the convergence electrode 24 as illustrated in FIG. 5, the timings at which the polarity switching of the voltages applied to both electrodes is completed coincide with each other as illustrated in FIG. 6. Therefore, when the polarity of the voltage is switched, generation of an undesired electric field between the electrodes is suppressed.

Even in the conventional mass spectrometer, the negative ion mode can be executed without causing an undesired electric field to act on the ions derived from the target substance if a sufficient time is left after the execution of the positive ion mode. However, if the target substance separated in the column of the liquid chromatograph is measured in both the positive ion mode and the negative ion mode in the liquid chromatograph mass spectrometer as in the present embodiment, it is necessary to complete the measurement in both modes in a limited time in which the target substance flows out from the column. By adopting the configuration of the present embodiment, it is possible to measure ions derived from the target substance in a short time and with high sensitivity.

In the negative ion mode, a voltage whose polarity is reversed from that of the positive ion mode is applied to each part, but the potential acting on the ions is the same as that in the positive ion mode. That is, a push electric field having a force of pushing negative ions in a direction from the push electrode 23 toward the convergence electrode 24 is formed between the push electrode 23 and the convergence electrode 24. Further, since a potential difference between the push electrode 23 and the heated capillary 25 is larger than a potential difference between the push electrode 23 and the convergence electrode 24, a reflected electric field having a force of more strongly pushing ions from the push electrode 23 toward the heated capillary 25 is formed. Furthermore, a converging electric field having a force of pushing negative ions in a direction from the converging electrode 24 toward the heated capillary 25, that is, from the inner edge of the opening part 241 of the converging electrode 24 toward the center thereof is also formed. By the action of these electric fields, negative ions are efficiently guided to the inlet end of the heated capillary 25 and introduced into the first intermediate vacuum chamber 30.

The ions introduced into the first intermediate vacuum chamber 30 are converged by the ion guide 31, and are introduced into the second intermediate vacuum chamber 40 through the opening at the top of the skimmer 32. The ions introduced into the second intermediate vacuum chamber 40 are further converged by the ion guide 41 and introduced into the analysis chamber 50 through the opening at a top of the skimmer 42. The ions introduced into the analysis chamber 50 are mass-separated by the quadrupole mass filter 51 and detected by the ion detector 52. Mass spectrum data in the negative ion mode is obtained by scanning the mass-to-charge ratio passing through the quadrupole mass filter 51 in a predetermined range.

Next, a liquid chromatograph mass spectrometer of a modification example will be described. In the liquid chromatograph mass spectrometer of the modification example, a configuration of the power feeding circuit is different from that of the above embodiment, and the other configurations are the same. Therefore, the components other than the power feeding circuit are denoted by the same reference signs as those in the above embodiment, and the description thereof is omitted.

Figure 7:
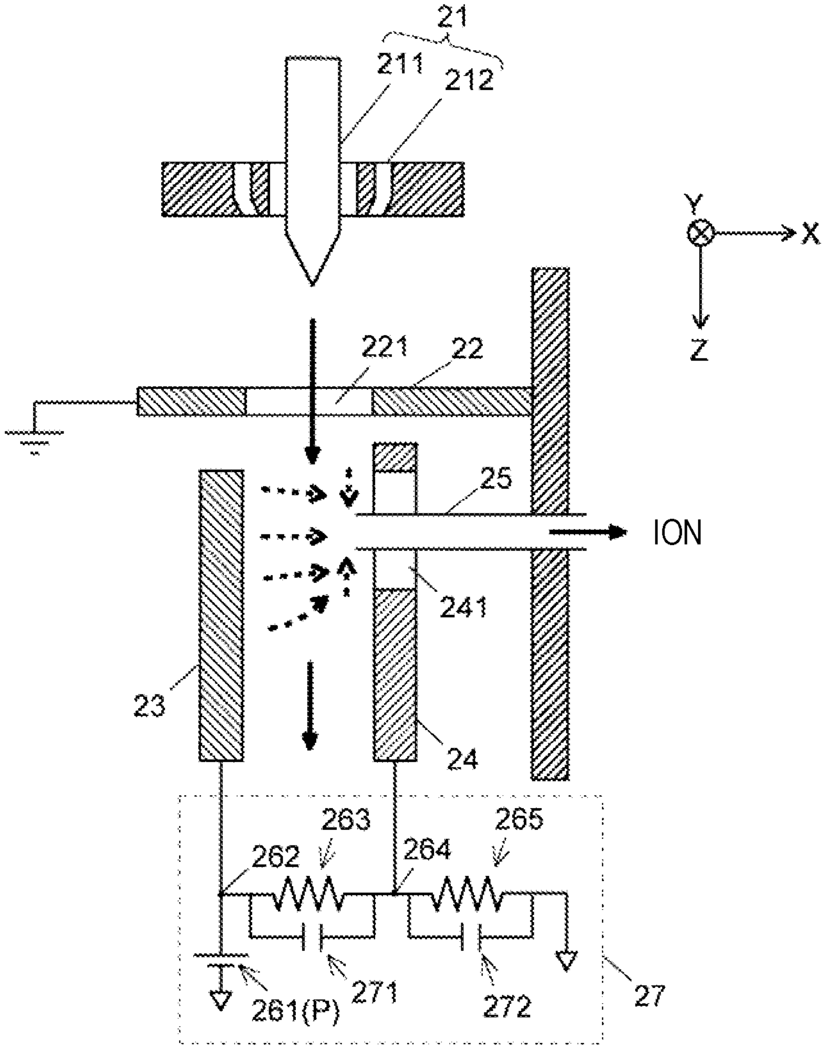
FIG. 7 is a diagram for explaining a configuration of an ionization source according to a modification example.

FIG. 7 is a schematic configuration diagram of an ionization source of the liquid chromatograph mass spectrometer of the modification example. A power feeding circuit 27 in the modification example is obtained by adding a first capacitor 271 and a second capacitor 272 to the configuration of the power feeding circuit 26 in the above embodiment. The first capacitor 271 is connected in parallel with the first resistance element 263, and the second capacitor 272 is connected in parallel with the second resistance element 265.

In an atmospheric pressure ionization source such as the ESI source of the above embodiment, the atmosphere exists between the push electrode 23 and the convergence electrode 24. Further, the atmosphere is also present between the convergence electrode 24 and the heated capillary 25 or between the ionization chamber 20 and the partition wall (Hereinafter, these are collectively referred to as GND.) of the first intermediate vacuum chamber 30. Therefore, a capacitive load (stray capacitance) of a non-negligible magnitude may occur between the push electrode 23 and the convergence electrode 24 or between the convergence electrode 24 and the GND depending on an arrangement (for example, a magnitude of a distance between the electrodes) and the state (the state of contamination of the electrode surface) of each electrode. When the stray capacitance is generated between them, the timing at which the voltage is applied to the push electrode 23 and the timing at which the voltage is applied to the convergence electrode 24 are deviated from each other, and as a result, the same overshoot or the like as that in the related art can occur.

The power feeding circuit 27 of the above modification example is used in such a case. The magnitudes of the capacitance C1 of the first capacitor 271 and the capacitance C2 of the second capacitor 272 may be determined so as to be (substantially) the same as a ratio between the capacitance Cpf (=C1+parasitic capacitance between the push electrode 23 and the convergence electrode 24) between the push electrode 23 and the convergence electrode 24 and the capacitance Cfg (=C2+parasitic capacitance between the convergence electrode 24 and the GND) between the convergence electrode 24 and the GND, and a ratio between the resistance value R1 of the first resistance element 263 and the resistance value R2 of the second resistance element 265. However, it is difficult to actually measure the capacitance Cpf between the push electrode 23 and the convergence electrode 24 and the capacitance Cfg itself between the convergence electrode 24 and the GND. The optimum capacitance of the first capacitor 271 and/or the second capacitor 272 can be determined based on a result of performing preliminary measurement in which the polarity of the measurement target ion is switched by introducing ions of a standard substance while appropriately changing the capacitance of the first capacitor 271 and/or the second capacitor 272.

Further, the first resistance element 263 and the second resistance element 265 in the power feeding circuit 26 of the above embodiment and the power feeding circuit 27 of the modification example may be variable resistors. If the target substance is easily ionized, the target substance is ionized in the vicinity of the outlet of the ESI ionization probe 21, and if the target substance is hardly ionized, the target substance is ionized at a position away from the outlet of the ESI ionization probe 21. That is, a path for drawing ions into the heated capillary 25 differs depending on the ionizability of the substance, and an optimum value of the magnitude of the applied voltage to the push electrode 23 and the convergence electrode 24 also differs. By making the first resistance element 263 and the second resistance element 265 variable resistances, an optimal voltage is applied to the push electrode 23 and the convergence electrode 24 for each target substance in a series of measurements, and the target substance can be measured with high sensitivity.

Further, the first capacitor 271 and/or the second capacitor 272 in the power feeding circuit 27 of the above modification example can be variable capacitors. As described above, the magnitude of the capacitive load (stray capacitance) generated between the push electrode 23 and the convergence electrode 24 or between the convergence electrode 24 and the GND can also change depending on the state of the mass spectrometer (such as the state of contamination of the electrode surface). By using the first capacitor 271 and/or the second capacitor 272 as variable capacitors, it is possible to set capacitance suitable for the state of the mass spectrometer at the time of measurement.

The embodiment and the modification example described above are all examples, and can suitably be altered according to the spirit of the present invention.

In both the embodiment and the modification example, the mass spectrometer is used, but the same configuration as described above can be used in other ion analyzers such as an ion mobility analyzer.

Figure 8:
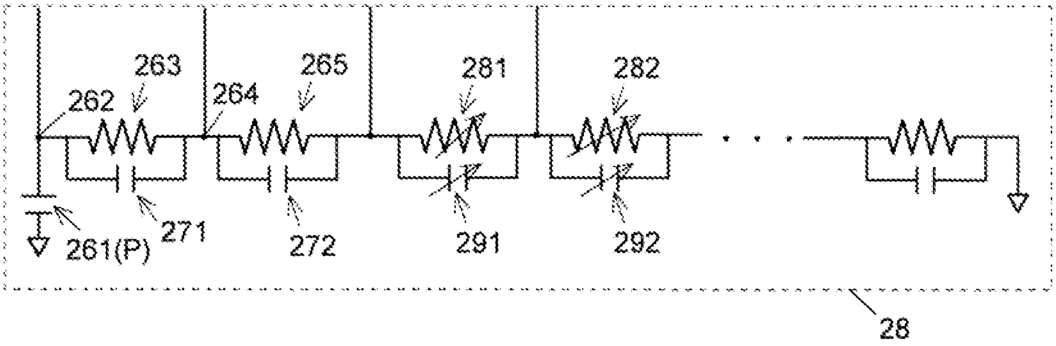
FIG. 8 is a diagram for explaining a modification example of the power feeding circuit.

Further, in the above embodiment and modification example, the case where the voltage is applied to the push electrode and the convergence electrode disposed in the ionization chamber has been described. However, the same power feeding circuit as described above can also be used when the voltage is applied to other electrodes. Examples of such an electrode include a plurality of ring electrodes constituting the ion guide 31 disposed in the first intermediate vacuum chamber 30. When voltages having the same polarity and different magnitudes are applied to three or more electrodes as in the ion guide 31, the number of resistance elements and/or capacitors may be increased as necessary as illustrated in a power feeding circuit 28 of FIG. 8. Further, as illustrated in FIG. 8, some resistance elements may be variable resistance elements 281 and 282, and some capacitors can be variable capacitors 291 and 292, for example, as appropriate.

[Modes]

It is understood by those skilled in the art that the plurality of exemplary embodiments described above are specific examples of the following modes.

(Clause 1)

An ion analyzer according to one mode includes:

a power feeding circuit in which a power supply connection part, a first electrode connection part, a first resistance element, a second electrode connection part, a second resistance element, and a grounding part are provided in series;

a power supply connected to the power supply connection part and configured to output both a DC positive voltage and a DC negative voltage;

a first voltage supply electrode connected to the first electrode connection part; and a second voltage supply electrode connected to the second electrode connection part.

The ion analyzer recited in Clause 1 uses the power feeding circuit in which the power supply connection part, the first electrode connection part, the first resistance element, the second electrode connection part, the second resistance element, and the grounding part are provided in series, and the power supply is connected to the power supply connection part to apply a voltage of a predetermined magnitude to the power supply connection part. As a result, the voltage of the predetermined magnitude is applied to the first voltage supply electrode connected to the first electrode connection part adjacent to the power supply connection part. Further, the voltage of the predetermined magnitude and a voltage of a magnitude corresponding to a resistance value of the first resistance element and a resistance value of the second resistance element are applied to the second voltage supply electrode connected to the second electrode connection part. That is, in the ion analyzer recited in Clause 1, since two types of voltages having a potential difference corresponding to the resistance values of the resistance elements can be simultaneously output to both the first voltage supply electrode and the second voltage supply electrode using a single power supply, there is no difference between the timing at which the polarity switching of the first voltage applied to the first voltage supply electrode is completed and the timing at which the polarity switching of the second voltage applied to the second voltage supply electrode is completed. Therefore, when the polarity of the voltage is switched, generation of an undesired electric field between the electrodes is suppressed.

(Clause 2)

In an ion analyzer recited in Clause 1, the first voltage supply electrode is a push electrode that is disposed on an opposite side of an ion intake port communicating an ionization chamber and an ion analysis section, and sandwiches an ion supply path with the ion intake port in the ionization chamber, and the second voltage supply electrode is a convergence electrode including an opening that surrounds the ion intake port in the ionization chamber.

The ion analyzer of Clause 1 can be suitably used as the ion analyzer of Clause 2 that applies a voltage to the push electrode and the convergence electrode for forming an electric field that transports ions introduced into the ionization chamber to the ion analysis chamber located at a subsequent stage of the ionization chamber.

(Clause 3)

In an ion analyzer recited in Clause 2, the ions are generated by an atmospheric pressure ionization source.

(Clause 4)

In an ion analyzer recited in Clause 3, the atmospheric pressure ionization source is an ESI source.

The ion analyzer recited in Clause 2 is used in the ion analyzer including the atmospheric pressure ionization source as recited in Clause 3, particularly, in the ion analyzer including the ESI source as recited in Clause 4, whereby the ion intake efficiency can be improved and the measurement sensitivity can be enhanced.

(Clause 5)

In an ion analyzer according to any one of Clause 1 to Clause 4, a resistance value(s) of the first resistance element and/or the second resistance element is/are variable.

In the ion analyzer of Clause 5, according to characteristics of an ion to be controlled, an electric field suitable for the ion can be formed.

(Clause 6)

In an ion analyzer recited in any one of Clause 1 to Clause 5, in the power feeding circuit, a capacitor is connected in parallel with the first resistance element and/or the second resistance element.

In the ion analyzer of Clause 6, a capacitive load (stray capacitance) that can be generated between the first electrode and the second electrode or between the second electrode and a housing of the analyzer or the like is canceled out, and it is possible to further suppress formation of an undesired electric field between the first voltage supply electrode and the second voltage supply electrode.

(Clause 7)

In an ion analyzer recited in Clause 6, capacitance of the capacitor is variable.

In the ion analyzer of Clause 7, the capacitance of the capacitor is appropriately changed according to an increase in stray capacitance due to adhesion of dirt to the first voltage supply electrode and the second voltage supply electrode and a change in the state of a place (the ionization chamber or the like) where both the electrodes are disposed, so that it is possible to further suppress formation of an undesirable electric field between the first voltage supply electrode and the second voltage supply electrode.

REFERENCE SIGNS LIST

1 . . . Liquid Chromatograph
13 . . . Column
14 . . . Autosampler
2 . . . Mass Spectrometer
20 . . . Ionization Chamber
21 . . . ESI Ionization Probe
211 . . . ESI Nozzle
212 . . . Assist Gas Nozzle
22 . . . Ground Electrode
221 . . . Opening Part
23 . . . Push Electrode (First Voltage Supply Electrode)
24 . . . Convergence Electrode (Second Voltage Supply Electrode)

241 . . . Opening Part
25 . . . Heated Capillary
26, 27, 28 . . . Power Feeding Circuit
261 . . . Power Supply Connection Part
262 . . . First Electrode Connection Part
263 . . . First Resistance Element
264 . . . Second Electrode Connection Part
265 . . . Second Resistance Element
271 . . . First Capacitor
272 . . . Second Capacitor
281 . . . Variable Resistance Element
291 . . . Variable Capacitor
30 . . . First Intermediate Vacuum Chamber
31 . . . Ion Guide
40 . . . Second Intermediate Vacuum Chamber
41 . . . Ion Guide
50 . . . Analysis Chamber
51 . . . Quadrupole Mass Filter
52 . . . Ion Detector
6 . . . Control And Processing Unit
61 . . . Storage Unit
62 . . . Measurement Control Unit
P . . . Power Supply

The invention claimed is:

1. An ion analyzer comprising:

a power feeding circuit in which a power supply connection part, a first electrode connection part, a first resistance element, a second electrode connection part, a second resistance element, and a grounding part are provided in series;

a power supply connected to the power supply connection part and configured to output both a DC positive voltage and a DC negative voltage;

a first voltage supply electrode connected to the first electrode connection part; and a second voltage supply electrode connected to the second electrode connection part;

wherein the first voltage supply electrode is a push electrode that is disposed on an opposite side of an ion intake port communicating an ionization chamber and an ion analysis section, and sandwiches an ion supply path with the ion intake port in the ionization chamber, and the second voltage supply electrode is a convergence electrode including an opening that surrounds the ion intake port in the ionization chamber.

2. The ion analyzer according to claim 1, wherein the ions are generated by an atmospheric pressure ionization source.

3. The ion analyzer according to claim 2, wherein the atmospheric pressure ionization source is an electrospray ionization (ESI) source.

4. The ion analyzer according to claim 1, wherein a resistance value(s) of the first resistance element and/or the second resistance element is/are variable.

5. The ion analyzer according to claim 1, wherein in the power feeding circuit, a capacitor is connected in parallel with the first resistance element and/or the second resistance element.

6. The ion analyzer according to claim 5, wherein capacitance of the capacitor is variable.

* * * * *